(12) United States Patent
Hsu et al.

(10) Patent No.: US 8,389,872 B2
(45) Date of Patent: Mar. 5, 2013

(54) ELECTRODE STRUCTURE ADAPTED FOR HIGH APPLIED VOLTAGE AND FABRICATION METHOD THEREOF

(75) Inventors: Chen Hsu, Daxi Township, Taoyuan County (TW); Chih-Ming Hu, Hsinchu (TW); Chun-Yen Lin, Tainan (TW); Wen-Sheng Lin, Toufen Township, Miaoli County (TW); Shih-Chieh Jang, Taoyuan (TW)

(73) Assignee: Hermes-Epitek Corp., Taipei (TW)

( * ) Notice: Subject to any disclaimer, the term of this patent is extended or adjusted under 35 U.S.C. 154(b) by 691 days.

(21) Appl. No.: 12/511,711

(22) Filed: Jul. 29, 2009

(65) Prior Publication Data

US 2011/0027615 A1    Feb. 3, 2011

(51) Int. Cl.
*H05K 1/11* (2006.01)
(52) U.S. Cl. ........................................ 174/267
(58) Field of Classification Search .................. None
See application file for complete search history.

(56) References Cited

U.S. PATENT DOCUMENTS

| | | | | |
|---|---|---|---|---|
| 5,847,918 | A * | 12/1998 | Shufflebotham et al. | 361/234 |
| 7,463,474 | B2 * | 12/2008 | Ritter et al. | 361/306.1 |
| 8,072,732 | B2 * | 12/2011 | Sato et al. | 361/303 |
| 2005/0082949 | A1 * | 4/2005 | Tsujiura | 310/339 |
| 2009/0108986 | A1 * | 4/2009 | Urano et al. | 338/309 |

\* cited by examiner

*Primary Examiner* — Gregory Thompson
(74) *Attorney, Agent, or Firm* — Muncy, Geissler, Olds & Lowe, PLLC

(57) ABSTRACT

An electrode structure adapted for high applied voltage is provided, which comprises a conductive plate substrate and a covering layer disposed thereon such that a covering percentage of the covering layer over the conductive plate substrate is more than 50%. Since area of the conductive plate substrate covered by the covering layer is larger than the area exposed, the possibility of arcing is reduced and the breakdown voltage applied to the electrode structure may be increased.

31 Claims, 5 Drawing Sheets

ELECTRODE STRUCTURE ADAPTED FOR HIGH APPLIED VOLTAGE AND FABRICATION METHOD THEREOF

BACKGROUND OF THE INVENTION

1. Field of the Invention

The present invention relates to an electrode structure and the fabrication method thereof, and more particularly to an electrode structure adapted for high applied voltage and the fabrication method thereof.

2. Description of the Related Art

FIG. 1a is a diagram schematically illustrating an electrode plate 100 with nearby electrode plates 200 and 300. When a voltage difference across electrode plates 100 and 200 or electrode plates 100 and 300 is substantially high, an electric discharge through the dielectric material such as air or vacuum, a phenomenon known as arcing, may happen. The arcing path from electrode plate 200 to 100 is referred as an upper arcing path; and from electrode plate 300 to 100 is referred as a lower arcing path. The upper and lower arcing paths form a single equivalent circuit which is illustrated in FIG. 1b, wherein capacitor $C_{100/200}$ and $C_{100/300}$ represent the parallel plate capacitor formed by electrode plate 100 and 200, and the parallel plate capacitor formed by electrode 100 and 300 respectively; and resistor $R_{100}$, in series with $C_{100/200}$ and $C_{100/300}$ in the respective arcing paths, represents the resistance of the electrode plate 100, which is made of aluminum for instance. Considering the upper arcing path for example, when a voltage $V_u$ is applied to the electrode plate 100, the voltage across $C_{100/200}$ may exceed the breakdown voltage of the dielectric therebetween, resulting in arcing, which can be considered as a short of $C_{100/200}$. Since resistance of $R_{100}$ made of metal is small, high amount of current therethrough may cause the electrode function to fail. Hence, the electrode plate 100 is commonly made of refractory metals which have high breakdown voltages, such as titanium Ti, tungsten W, or graphite, or metals treated with surface modification in order to prevent high voltage breakdown.

However, even with electrodes made of high breakdown voltage materials, possible power failure caused by arcing is still unresolved. Therefore, there is a need to prevent arcing from happening while maintaining the electrode plate to be conductive.

SUMMARY OF THE INVENTION

The present invention is directed to providing an electrode structure adapted for high applied voltage and the fabrication method thereof. The possibility of arcing is reduced, so that the breakdown voltage applied to the electrode structure may be increased, by covering the surface of the conductive plate substrate with a covering layer such that the covered area is more than the exposed area of the conductive plate substrate.

An electrode structure adapted for high applied voltage according to one embodiment includes: a conductive plate substrate having an upper surface, a lower surface, and a side-wall surrounding a periphery of the conductive plate substrate; and a covering layer formed on the upper surface and the lower surface of the conductive plate substrate with a portion of the conductive plate substrate exposed, wherein the covering layer is made of ceramic material, and is of a covering percentage over the conductive plate more than about 50%, and comprises: a first covering layer, formed on the upper surface of the conductive plate substrate; and a second covering layer, formed on the lower surface of the conductive plate substrate.

An electrode structure adapted for high applied voltage according to one embodiment further includes a metal layer or a metal mesh layer disposed on the conductive plate substrate not covered by the covering layer and/or a portion of the covering layer.

A method for fabricating the electrode structure adapted for high applied voltage according to one embodiment includes forming the covering layer on the conductive plate substrate. The procedure of forming the covering layer can be carried out by micro arc oxidation (MAO), or by atmosphere plasma spray (APS).

BRIEF DESCRIPTION OF THE DRAWINGS

The objectives, technical contents and characteristics of the present invention can be more fully understood by reading the following detailed description of the preferred embodiments, with reference made to the accompanying drawings, wherein:

FIG. 1b is a schematic diagram of the equivalent circuit of the arcing paths illustrated in FIG. 1a;

FIG. 2b is a schematic diagram of the equivalent circuit of the arcing paths illustrated in FIG. 2a;

FIG. 3b is a schematic diagram of the equivalent circuit of the arcing paths illustrated in FIG. 3a;

DETAILED DESCRIPTION OF THE INVENTION

The present invention provides an electrode structure adapted for high applied voltage and the fabrication method thereof, which comprises a conductive plate substrate and a covering layer, made of ceramic material, over the conductive plate substrate. The embodiments presented below are intended for the purpose of illustration, and should not be used for limiting the scope of the present invention.

Figure 2A:
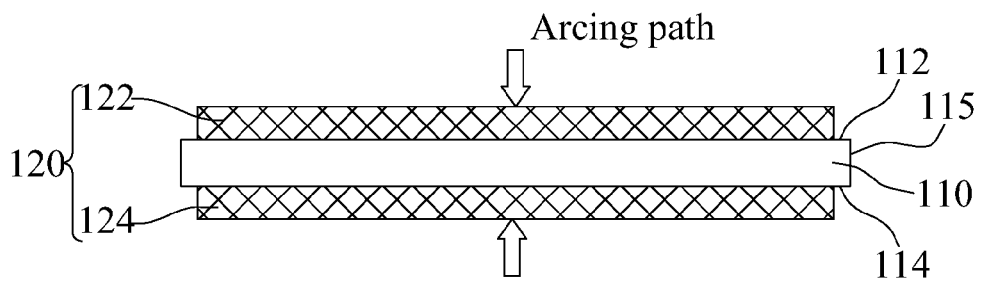
FIG. 2a is a schematic diagram illustrating one embodiment of the electrode structure adapted for high applied voltage of the present invention.

FIG. 2a depicts a cross-sectional view of an electrode structure adapted for high applied voltage according to one embodiment. As illustrated in the figure, a conductive plate substrate 110, e.g. an electrode plate, may be a thin plate, and may be made of metal, non-limiting examples of which are Al, Ti, Mg, Fe and W, or nonmetal, wherein the conductive plate substrate 110 having an upper surface 112, a lower surface 114, and a side-wall 115 surrounding a periphery of the conductive plate substrate 110. A covering layer 120, made by ceramic material in one embodiment, is formed on the upper surface 112 and the lower surface 114 of the conductive plate substrate 110 with a portion of the conductive plate substrate 110 exposed, and the covering percentage of the covering layer 120 over the conductive plate substrate 110 is more than 50%, wherein the covering layer 120 comprises a first covering layer 122 and a second covering layer 124. The first covering layer 122 is formed on the upper surface 112 of the conductive plate substrate 110 and the second covering layer 124 is formed on the lower surface 114 of the conductive plate substrate 110. Since the area of the conductive plate substrate 110 covered by the covering layer 120 is substantially more than the area exposed, the possibility of arcing is reduced so that breakdown voltage applied to the conductive plate substrate 110 can be highly increased.

Figure 1A:
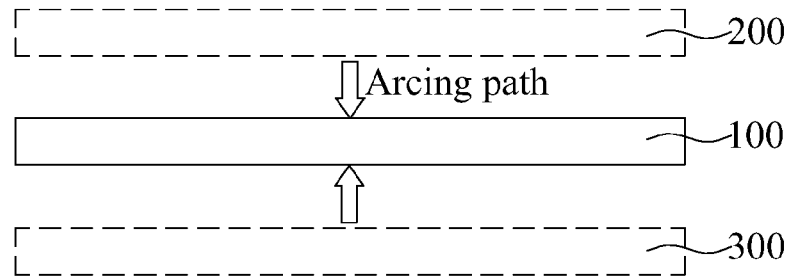
FIG. 1a is a schematic diagram illustrating an electrode plate of the prior art and its arcing paths.
Figure 1B:
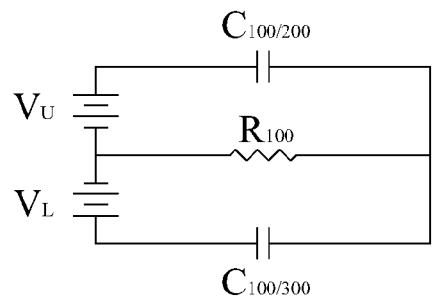
Figure 2B:
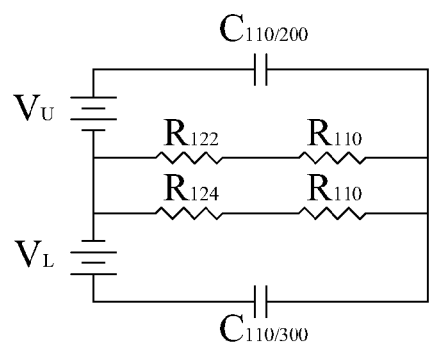

In continuation to the above illustration, the ability to sustain higher breakdown voltage when a substantial portion of the surface area of the conductive plate substrate 110 is covered with ceramic material may be explained with reference to FIG. 2b, in which an equivalent circuit of the arcing paths of the electrode structure adapted for high applied voltage is shown. As illustrated in FIG. 1a, arcing happens when another electrode plate 200 or 300 is placed nearby the electrode plate 100 and the voltage difference across the two electrode plates 100 and 200 or electrode plates 100 and 300 exceed the breakdown voltage of the dielectric therebetween. Referring to FIG. 2b, the upper and lower arcing paths form a single circuit wherein the equivalent circuit of the upper arcing path includes a capacitor $C_{110/200}$ representing the capacitance between the conductive plate substrate 110 and the implied electrode plate 200, and resistors $R_{110}$ and $R_{122}$ representing the resistance of the conductive plate substrate 110 and the resistance of the upper covering layer 122 respectively; the equivalent circuit of the lower arcing path includes a capacitor $C_{110/300}$ representing the capacitance between the conductive plate substrate 110 and the implied electrode plate 300, and resistors $R_{110}$ and $R_{124}$ representing the resistance of the conductive plate substrate 110 and the resistance of the lower covering layer 124, respectively. The total resistance of an arcing path $R_T$ is therefore equal to the resistance of $(R_{122}+R_{100})//(R_{124}+R_{100})$. Since the resistance of $R_{122}$ or $R_{124}$ made of ceramic material is large, the total resistance is also large; as a result, when a voltage $V_u$ is applied, the instantaneous current through the resistive network of resistance $R_T$ causes a large amount voltage drop which significantly reduces the voltage across the capacitor $C_{100/200}$ or $C_{110/300}$, thereby protecting the capacitor $C_{110/200}$ or $C_{110/300}$ from breaking down.

Figure 3A:
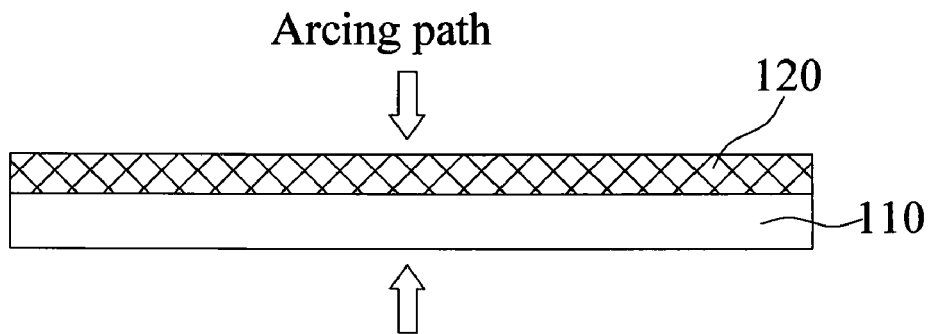
FIG. 3a is a schematic diagram illustrating a counter example of the present invention.
Figure 3B:
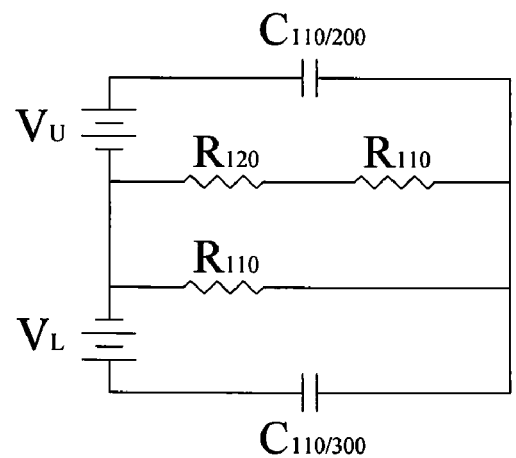

As illustrated in FIG. 2a, the covering percentage of the covering layer 120 over the conductive plate substrate 110 is more than 50%. A ratio which is chosen intentionally as explained in the following. FIG. 3a illustrates a counter example where the covering percentage of the covering layer 120 is only 50% or less. The equivalent circuit of FIG. 3a is provided in FIG. 3b, wherein the upper arcing path and the lower arcing path form a single circuit. The total resistance is therefore equal to the resistance of $(R_{120}+R_{110})//R_{110}$, which is smaller than the resistance of $R_{110}$. Consequently, the voltage drop across the resistive network of such a small total resistance is small, which leaves capacitor $C_{110/200}$ and $C_{110/300}$ effectively unprotected.

Variations of the above-mentioned embodiment are introduced below, and equivalent circuit analysis may be applied to the following embodiments in a similar manner as for the embodiment illustrated in FIG. 2a.

Figure 4:
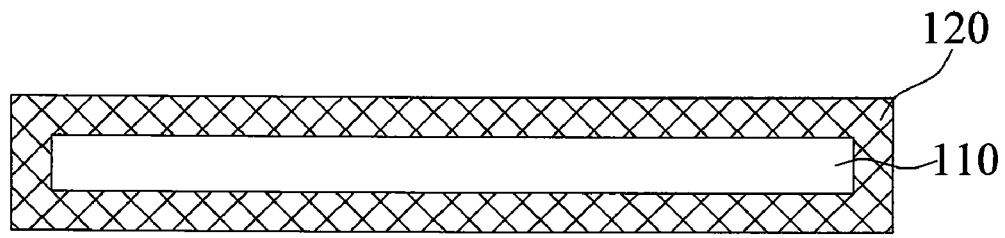
FIG. 4 is a schematic diagram of an electrode structure adapted for high applied voltage according to one embodiment of the present invention.

In another embodiment, the covering percentage of the covering layer 120 over the conductive plate substrate 110 is over 70%. In still another embodiment, the covering layer 120 may cover the conductive plate substrate 110 completely, i.e. 100% coverage percentage, as illustrated in FIG. 4.

Figure 5A:
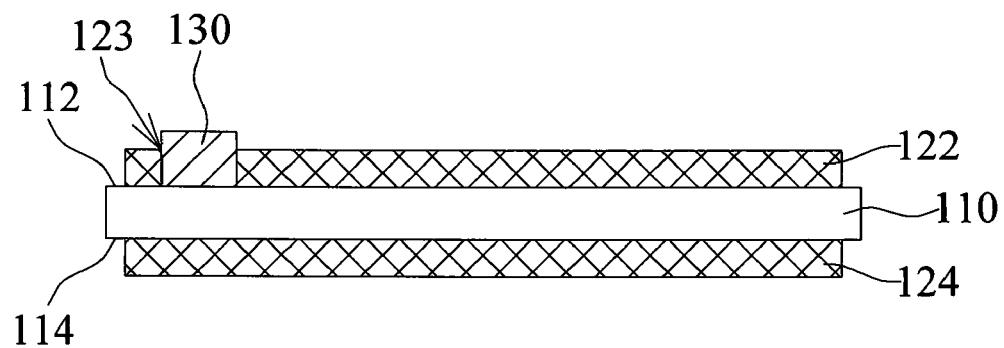
FIG. 5a, FIG. 5b and FIG. 5c are schematic diagrams illustrating different embodiments of the electrode structure adapted for high applied voltage of the present invention.
Figure 5B:
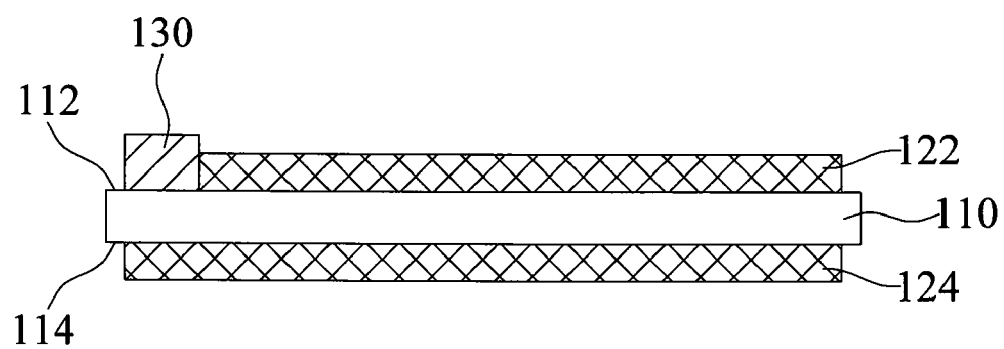
Figure 5C:
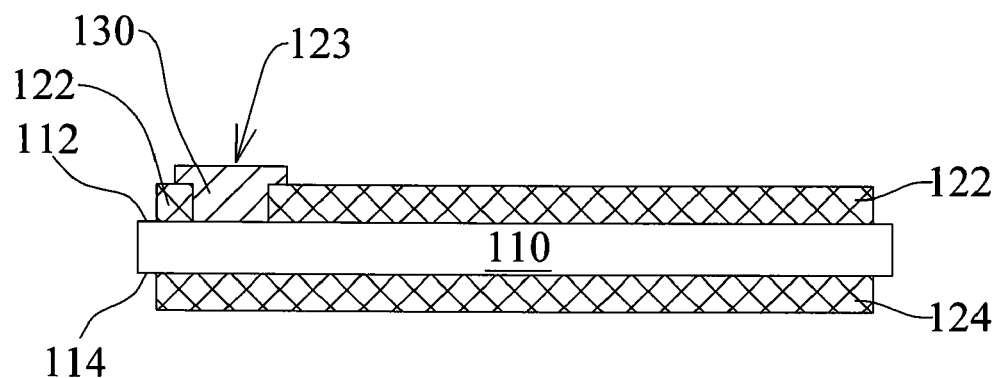

Furthermore, FIG. 5a, FIG. 5b and FIG. 5c illustrate various embodiments for a type of electrode structure adapted for high applied voltage which further comprises a metal mesh layer 130 disposed on the conductive plate substrate 110 not covered by the covering layer (including 122 and 124). Each embodiment is described as follows. In the embodiment illustrated in FIG. 5a, the first covering layer 122 includes at least an opening 123 to expose a portion of the upper surface 112 of the conductive plate substrate 110, and the metal mesh layer 130 is disposed at the opening 123 and covers the portion of the upper surface 112 exposed. In another embodiment illustrated in FIG. 5b, the first covering layer 122 is formed on the first surface of the conductive plate substrate 110, with a portion of the upper surface 112 exposed, on which a metal mesh layer 130 is disposed. In still another embodiment illustrated in FIG. 5c, the metal mesh layer 130 covers a portion of the first covering layer 122 along the periphery of the opening 123. In the foregoing embodiments, FIG. 5a, FIG. 5b and FIG. 5c illustrate examples where the metal mesh layer 130 is disposed on the upper surface 112; however, it can be readily understood that same metal mesh layer 130 may be disposed on the lower surface 114 of the conductive plate substrate 110.

Figure 6A:
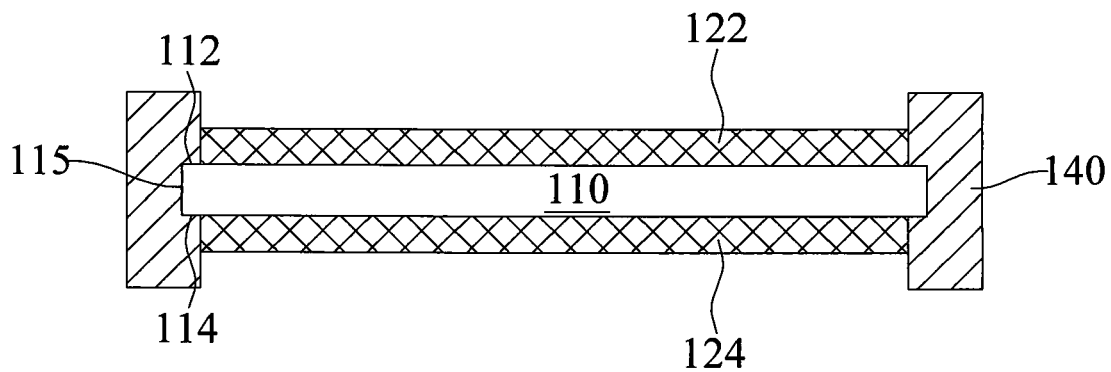
FIG. 6a and FIG. 6b are schematic diagrams illustrating different embodiments of the electrode structure adapted for high applied voltage of the present invention.
Figure 6B:
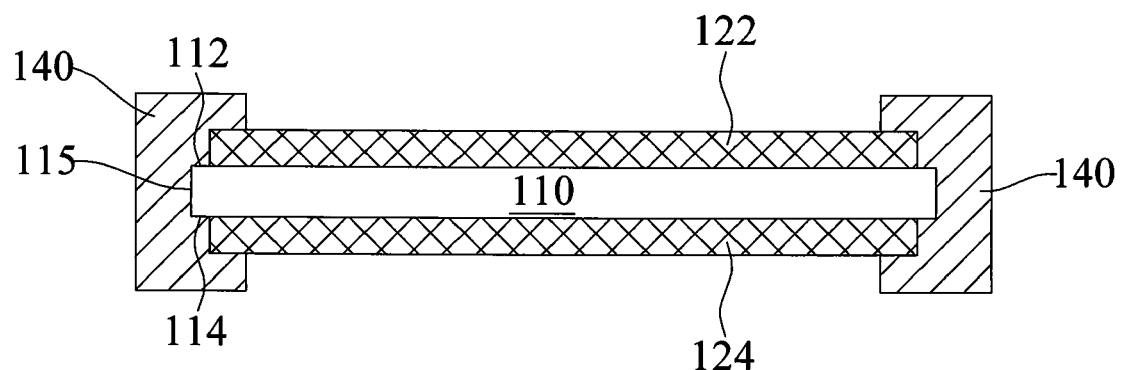

In continuation to the above description, FIG. 6a and FIG. 6b illustrate embodiments for a type of electrode structure adapted for high applied voltage which further comprises a metal layer 140 wrapping the side-walls 115 of the conductive plate substrate 110 not covered by the covering layer (including 122 and 124). Referring to FIG. 6a, the first covering layer 122 and the second covering layer 124 are formed on the upper 112 and lower surfaces 114 of the conductive plate substrate respectively with the peripheral border of the upper surface 112 and the lower surface 114 exposed. The metal layer 140 encapsulates the peripheral border of the upper and lower surfaces 112, 114 including the side-walls 115 of the conductive plate substrate. In another embodiment illustrated in FIG. 6b, the metal layer 140 wraps the side-walls 115 and covers a portion of the upper surface 112 and a portion of the first covering layer 122, and a portion of the lower surface 114 and a portion of the second covering layer 124. In the foregoing two embodiments, the metal layer 140 may be a metal plate or a metal mesh layer.

Figure 7:
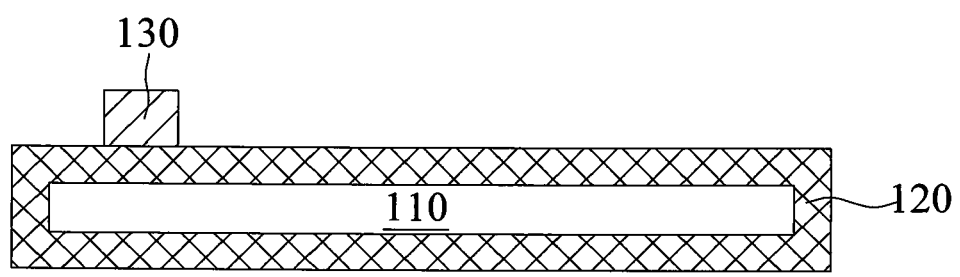
FIG. 7 is a schematic diagram illustrating one embodiment of the electrode structure adapted for high applied voltage of the present invention.
Figure 8:
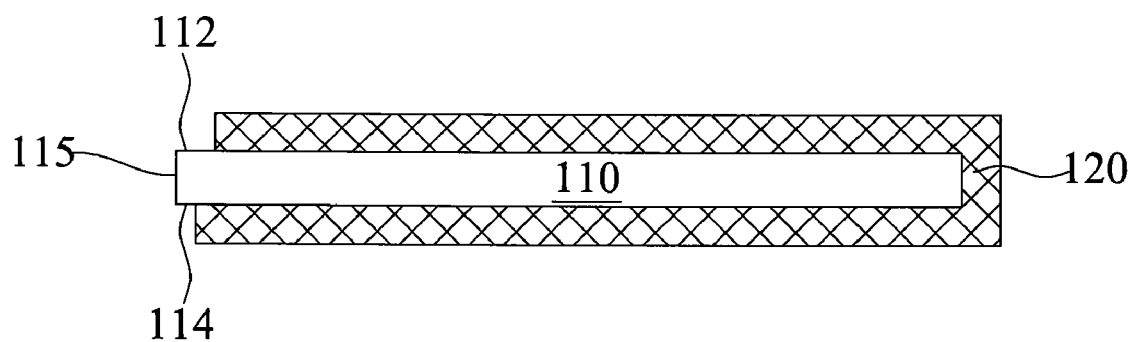
FIG. 8 is a schematic diagram illustrating one embodiment of the electrode structure adapted for high applied voltage of the present invention.
Figure 9:
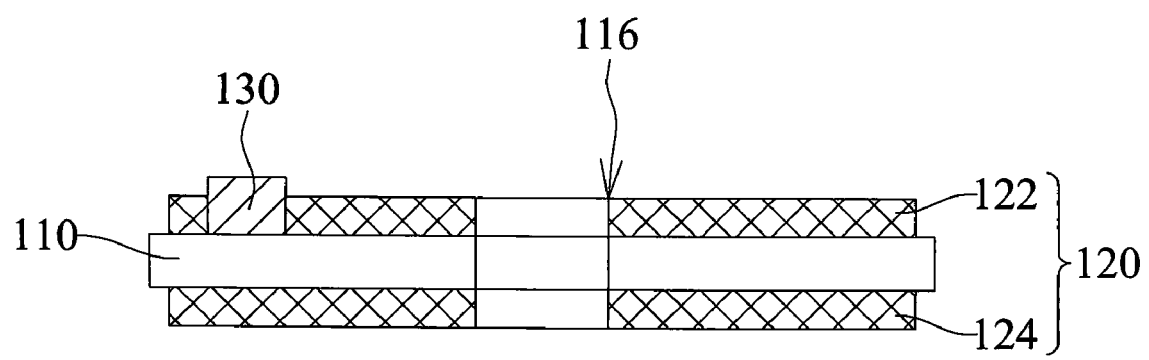
FIG. 9 is a schematic diagram illustrating one embodiment of the electrode structure adapted for high applied voltage of the present invention.

In an embodiment illustrated in FIG. 7, a metal mesh layer 130 can be directly formed on the covering layer 120. Or as illustrated in FIG. 8, with the covering percentage being over 50% given as a priori, the covering layer 120 may encapsulate one of the side-walls 115 of the conductive plate substrate 110. As illustrated in FIG. 5a, FIG. 5b and FIG. 5c, in other embodiments, the electrode structure illustrated in FIG. 8 may further includes a metal mesh layer 130, which is disposed on the covering layer 120 and/or a portion of the conductive plate substrate 110 exposed. As illustrated in FIG. 6a, and FIG. 6b, in still other embodiments, the electrode structure illustrated in FIG. 8 further includes a metal layer 140 wrapping a portion of the peripheral border, including one of the side-walls 115, of the conductive plate substrate 110 that is not covered by the covering layer 120, and optionally covering a portion of the covering layer 120. The metal layer 140 may be a metal plate or a metal mesh layer.

Furthermore, in the aforementioned embodiments, the electrode structure adapted for high applied voltage may further include an aperture 116 through the conductive plate substrate 110 and the covering layer 120, as illustrated in FIG.

9, wherein the covering layer 120 may be optionally disposed on the side-wall of the aperture structure 116.

One embodiment of the fabrication method for the electrode structure adapted for high applied voltage according foregoing embodiments comprises: providing a conductive plate substrate; and forming a covering layer on the surface of the conductive substrate, wherein the procedure of forming the covering layer may be carried out but not limited to by micro arc oxidation (MAO), or atmosphere plasma spray (APS). The covering percentage of the covering layer as mentioned in the foregoing embodiments is more than 50%, preferably 70% and may be even 100%. Another perspective that explains the arcing prevention capability of the ceramic covering layer is that when the conductive plate substrate is covered by the covering layer, the electrons are redistributed evenly so that the chance to build excessive voltage locally is reduced Next, in the previously mentioned structures, the step of forming the metal plate or metal mesh layer may be carried out but not limited to by electroplating, electroless plating or deposition. In one embodiment, the metal plate or the metal mesh layer is a preformed plate product, finished or semifinished, and is disposed on the conductive plate substrate by way of fastening. The formation of the aperture structure on the conductive plate substrate may be through direct punching, drilling, etc, a procedure which can be executed before or after the formation of the covering layer and/or the metal layer.

According to the foregoing description, an inventive aspect of the present invention is to exploit ceramic material as a covering layer formed on a conductive plate substrate, and the area of the conductive plate substrate covered is more than the area exposed. As a result, arcing situations are effectively reduced and the breakdown voltage applied to the conductive plate substrate may be significantly increased. In addition, the area of the conductive plate substrate not covered by the covering layer serve the purpose for the electrode structure remaining to be conductive.

In conclusion, the present invention, by covering the surface of the conductive plate substrate with a covering layer such that the covered area is more than the exposed area of the conductive plate substrate, reduces the possibility of arcing thereby increases the breakdown voltage that may be applied to the electrode structure.

The embodiments described above are to demonstrate the technical contents and characteristics of the preset invention to enable the persons skilled in the art to understand, make, and use the present invention. However, it is not intended to limit the scope of the present invention. Therefore, any equivalent modification or variation according to the spirit of the present invention is to be also included within the scope of the present invention.

What is claimed is:

1. An electrode structure adapted for high applied voltage comprising:
   a conductive plate substrate having an upper surface, a lower surface, and a side-wall surrounding a periphery of said conductive plate substrate; and
   a covering layer formed on said upper surface and said lower surface of said conductive plate substrate with a portion of said conductive plate substrate exposed, wherein said covering layer is made of ceramic material, and is of a covering percentage over said conductive plate substrate more than about 50%, and comprises:
   a first covering layer, formed on said upper surface of said conductive plate substrate; and
   a second covering layer, formed on said lower surface of said conductive plate substrate.

2. The electrode structure adapted for high applied voltage according to claim 1, wherein said covering percentage is more than about 70%.

3. The electrode structure adapted for high applied voltage according to claim 1, wherein said covering percentage is 100%.

4. The electrode structure adapted for high applied voltage according to claim 1, further comprises a metal mesh layer disposed on said conductive plate substrate not covered by said covering layer.

5. The electrode structure adapted for high applied voltage according to claim 1, further comprises a metal layer disposed on said conductive plate substrate not covered by said covering layer and a portion of a said covering layer.

6. The electrode structure adapted for high applied voltage according to claim 5, wherein said metal layer may be a metal plate or a metal mesh layer.

7. The electrode structure adapted for high applied voltage according to claim 1, further comprises a metal plate or a metal mesh layer disposed on said covering layer.

8. The electrode structure adapted for high applied voltage according to claim 1, wherein said covering layer covers a portion of the side-walls of said conductive plate substrate.

9. The electrode structure adapted for high applied voltage according to claim 1, further comprises an aperture through said conductive plate substrate and said covering layer.

10. The electrode structure adapted for high applied voltage according to claim 1, wherein said conductive plate substrate is a thin plate.

11. The electrode structure adapted for high applied voltage according to claim 1, wherein said conductive plate substrate may be made of metal or non-metal material.

12. A method for fabricating the electrode structure adapted for high applied voltage according to claim 1, comprising the following steps:
   providing said conductive plate substrate; and
   forming said covering layer on said conductive plate substrate.

13. The method for fabricating the electrode structure adapted for high applied voltage according to claim 12, wherein said step for forming said covering layer is carried out by micro arc oxidation (MAO), or by atmosphere plasma spray (APS).

14. The method for fabricating the electrode structure adapted for high applied voltage according to claim 12, wherein said covering percentage is more than about 70%.

15. The method for fabricating the electrode structure adapted for high applied voltage according to claim 12, wherein said covering percentage is 100%.

16. The method for fabricating the electrode structure adapted for high applied voltage according to claim 12, further comprises forming a metal mesh layer on said conductive plate substrate not covered by said covering layer.

17. The method for fabricating the electrode structure adapted for high applied voltage according to claim 16, wherein said step for forming said metal mesh layer is carried out by electroplating, electroless plating or deposition.

18. The method for fabricating the electrode structure adapted for high applied voltage according to claim 16, wherein said metal mesh layer is a preformed plate product, finished or semifinished, and is fastened to said conductive plate substrate not covered by said covering layer.

19. The method for fabricating the electrode structure adapted for high applied voltage according to claim 12, further comprises forming a metal layer on said conductive plate substrate not covered by said covering layer and a portion of a said covering layer.

20. The method for fabricating the electrode structure adapted for high applied voltage according to claim 19, wherein said step for forming said metal mesh layer is carried out by electroplating, electroless plating or deposition.

21. The method for fabricating the electrode structure adapted for high applied voltage according to claim 12, further comprises forming a metal plate or a metal mesh layer on said covering layer.

22. The method for fabricating the electrode structure adapted for high applied voltage according to claim 21, wherein said step of forming said metal plate or said metal mesh layer is carried out by electroplating, electroless plating or deposition.

23. The method for fabricating the electrode structure adapted for high applied voltage according to claim 21, wherein said metal plate or said metal mesh layer is a preformed plate product, finished or semifinished, and is fastened to said conductive plate substrate not covered by said covering layer.

24. The method for fabricating the electrode structure adapted for high applied voltage according to claim 12, further comprises forming an aperture through said conductive substrate and said covering layer.

25. An electrode structure adapted for high applied voltage comprising:
a conductive plate substrate having an upper surface, a lower surface, and a side-wall surrounding a periphery of said conductive plate substrate;
a covering layer formed on said upper surface and said lower surface of said conductive plate substrate with a portion of said conductive plate substrate exposed, wherein said covering layer is made of ceramic material, and is of a covering percentage over said conductive plate more than about 50%, and comprises: a first covering layer, formed on said upper surface of said conductive plate substrate; and a second covering layer, formed on said lower surface of said conductive plate substrate; and
a metal layer wrapping said side-wall of said conductive plate substrate, and covering a portion of said upper surface and a portion of said first covering layer, and a portion of said lower surface and a portion of said second covering layer.

26. The electrode structure adapted for high applied voltage according to claim 25, wherein said metal layer is a metal plate or a metal mesh layer.

27. An electrode structure adapted for high applied voltage comprising:
a conductive plate substrate having an upper surface a lower surface and a side-wall surrounding a periphery of said conductive plate substrate;
a covering layer formed on said upper surface and said lower surface of said conductive plate substrate with a portion of said conductive plate substrate exposed, wherein said covering layer is made of ceramic material and is of a covering percentage over said conductive plate substrate more than 50%, and comprises: a first covering layer, formed on said upper surface of said conductive plate substrate, and with at least an opening exposing a portion of said upper surface; and a second covering layer, formed on said lower surface of said conductive plate substrate; and
a metal mesh layer disposed on said upper surface and covering said upper surface exposed by said opening.

28. The electrode structure adapted for high applied voltage according to claim 27, wherein said metal mesh layer covers also a portion of said first covering layer along the periphery of said opening.

29. An electrode structure adapted for high applied voltage comprising:
a conductive plate substrate having an upper surface, a lower surface, and a side-wall surrounding a periphery of said conductive plate substrate;
a covering layer formed on said upper surface and said lower surface of said conductive plate substrate with a portion of said conductive plate substrate exposed, wherein said covering layer is made of ceramic material, and is of a covering percentage over said conductive plate more than about 50%, and comprises: a first covering layer, formed on said upper surface of said conductive plate substrate; and a second covering layer, formed on said lower surface of said conductive plate substrate; and
a metal mesh layer disposed on an exposed portion of said conductive plate substrate.

30. An electrode structure adapted for high applied voltage comprising:
a conductive plate substrate having an upper surface, a lower surface, and a side-wall surrounding a periphery of said conductive plate substrate;
a covering layer formed on said upper surface and said lower surface of said conductive plate substrate with a portion of said conductive plate substrate exposed, wherein said covering layer is made of ceramic material, and is of a covering percentage over said conductive plate more than about 50%, and comprises: a first covering layer, formed on said upper surface of said conductive plate substrate, and exposing peripheral border of said upper surface; and a second covering layer, formed on said lower surface of said conductive plate substrate, and exposing peripheral border of said lower surface; and
a metal layer wrapping said side-wall of said conductive plate substrate and covering exposed peripheral border, of said upper surface and said lower surface respectively.

31. The electrode structure adapted for high applied voltage according to claim 30, wherein said metal layer is a metal plate or a metal mesh layer.

* * * * *